United States Patent

[11] 3,600,064

| [72] | Inventor | Richard N. Walz<br>White Bear Lake, Minn. |
|---|---|---|
| [21] | Appl. No. | 759,907 |
| [22] | Filed | Sept. 16, 1968 |
| [45] | Patented | Aug. 17, 1971 |
| [73] | Assignee | Minnesota Mining and Manufacturing Company<br>Saint Paul, Minn. |

[54] PORTABLE MAGNIFIER WITH A RADIOLUMINOUS LIGHT SOURCE
5 Claims, 3 Drawing Figs.

[52] U.S. Cl. .................................................... 350/236, 350/247
[51] Int. Cl. ....................................................... G02b 27/02
[50] Field of Search ............................................ 350/235–238, 245–248; 250/71; 240/2.18, 2.25, 6.4

[56] References Cited
UNITED STATES PATENTS

| 1,960,114 | 5/1934 | Lindsay | 350/235 |
|---|---|---|---|
| 2,394,946 | 2/1946 | Stegeman | 350/248 |
| 2,883,770 | 4/1959 | Lieb | 250/71 |
| 2,953,684 | 9/1960 | MacHutchin | 250/71 |

FOREIGN PATENTS

| 1,378,704 | 1964 | France | 350/236 |

*Primary Examiner*—David Schonberg
*Assistant Examiner*—Michael J. Tokar
*Attorney*—Kinney, Alexander, Sell, Steldt and Delahunt

ABSTRACT: Self-luminous portable magnifier comprising a radioluminous light source to illuminate and a lens to magnify visually recorded data to be read. The combination provides substantially uniform illumination of the magnified portion of the matter to be read.

INVENTOR.
RICHARD N. WALZ
BY Kinney, Alexander,
Sell, Steldt & DeLaHunt
ATTORNEYS

PORTABLE MAGNIFIER WITH A RADIOLUMINOUS LIGHT SOURCE

This invention relates to self-luminous devices and more particularly to magnifiers with useful self-contained radioluminescent sources for illuminating the matter to be magnified.

Heretofore devices containing self-luminous light sources used the light emitted thereby for self-illumination, thus limiting the usefulness of these devices to marking objects or locations. For example, one such device as described in U.S. Pat. No. 2,953,684 consists of a self-luminous phosphor layer in a metal cup which is excited by a radioactive gas, tritium. The illumination given off is magnified by a lens located in front of the light source. The concentration of a radioluminous light source behind a lens does not provide illumination suitable for reading and thus is only desirable as a marker.

The present invention provides a portable illuminating magnifier suitable for reading visually recorded data and comprises, in combination, a lens and a radioluminous source of light enclosed in a frame with an aperture therein. The radioluminescent source is in the form of a ring or band of such diameter and location in the lens mount that a uniform illumination of the magnified subject matter is given at a distance equal to focal length of the lens when in use. The focal length of the lens and the diameter of the radioluminous ring are approximately equal. Consequently, the distance between the radioluminous ring and the matter to be read also approximately equal to the diameter of the radioluminous ring. This combination of effects results in substantially uniform illumination of the magnified reading matter. This combination of radioluminescent illumination and a magnifying lens dimensionally related so as to bring about this result is believed to be unique, and no prior device incorporating this combination is known to the applicant.

The primary function of the invention is to replace a flashlight for such operations as map reading. However, the invention is not so limited and may be used to illuminate a variety of materials. There are no batteries to wear out or malfunction, and there are no light bulbs to break. The unit is much smaller and much lighter in weight than a flashlight. Moreover, the light is much more diffuse than the light from a flashlight, although sufficient for the purpose. These qualities are very desirable to the military and to sportsmen since in the case of sudden and unexpected exposure of the unit, the detection of this light takes place over a much smaller area than the detection of a penetrating beam of light emitted from a flashlight.

The invention will be better understood from the following description considered in connection with the accompanying drawings, in which.

Figure 1:
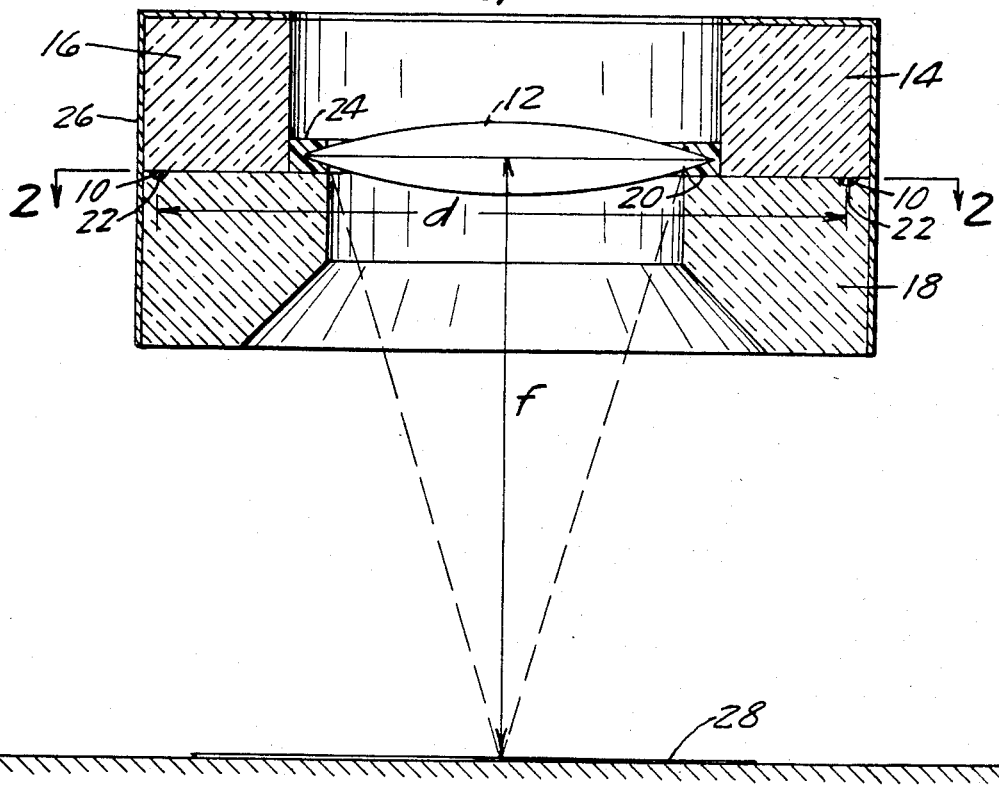
FIG. 1 is a vertical section taken on a diameter of the circular light source.
Figure 2:
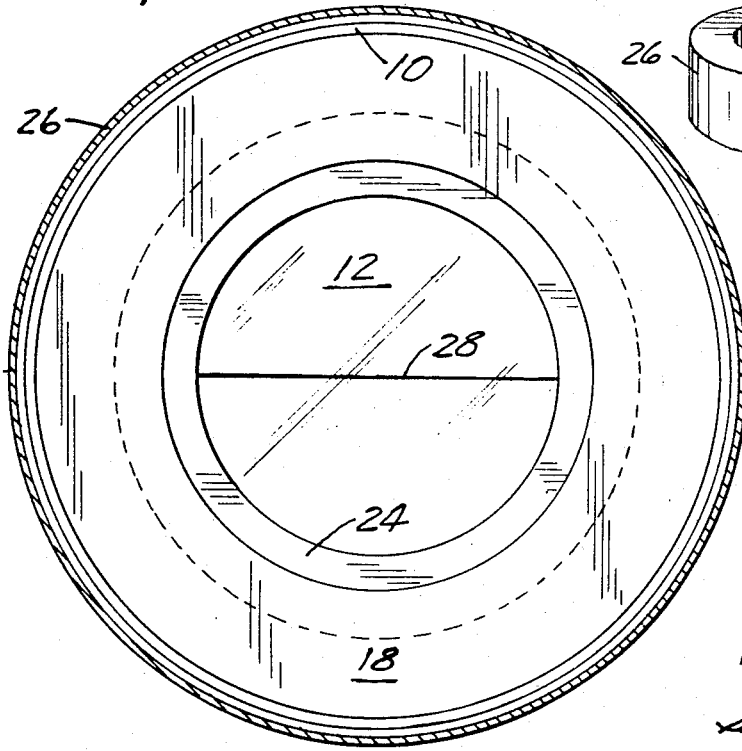
FIG. 2 is a horizontal section of the invention taken at the level of the circular light source.
Figure 3:
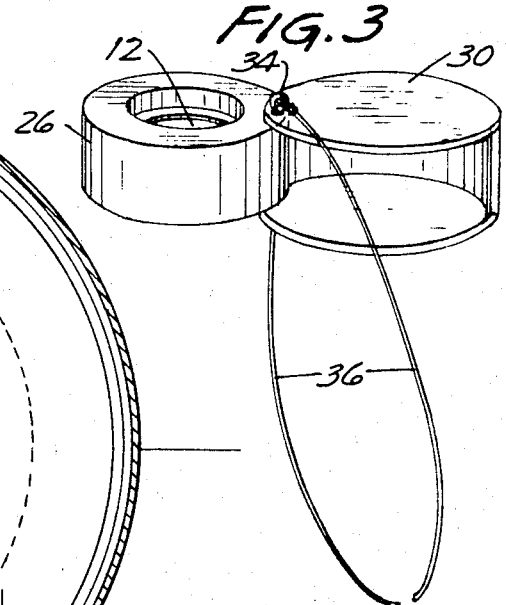
FIG. 3 is a view in perspective of a portable magnifier.

Referring to FIGS. 1, 2, and 3, frame 14 is formed of two rings of acrylic plastic 16 and 18 of equal outer diameter. Ring 16 may be made out of nontransparent material which would be compatible with the lower ring. The lower ring 18 has a circumferential groove 22 on its top surface into which the radioluminous material 10, e.g., a paint containing a radioisotope such as Promethium-147 and a phosphor, in a suitable vehicle is deposited. The upper ring 16 is then laminated to the lower ring 18 as by cementing or with conventional fasteners (not shown). The inner diameter of ring 18 is smaller than that of ring 16, whereby an inner circumferential offset or shoulder in the central opening of the frame is formed when the rings are joined as shown. A radioluminous ring may also be molded into the frame to form a single solid piece.

Other isotopes may be used to activate the phosphor for this invention, such as Nickel-63, Strontium-90 and Carbon-14. In addition, gas-activated radioluminous sources could also be used. For example, a ring-shaped glass tube could be coated on the inside with phosphor and filled with tritium gas or Krypton-85 gas to excite the phosphor layer and produce illumination and placed in groove 22. It may also be desirable to use several tubes in the form of an arc, the tubes being sectioned or in a series of concentric ring.

The lens 12 is located within the lumen of frame 14 (16 and 18) so as to be coaxial therewith and with the radioluminous ring 10. Lens 12 is supported on shoulder 20 and held in place by cement or retainer 24. To reduce costs, the lens can be made of plastic and actually molded as part of one of the rings 16 or 18.

The outside of the viewer, on surfaces through which there is no viewing, is coated with metal, e.g., lead tape 26, for radiation and light shielding. The external surfaces may first be coated with white paint before the application of the lead shielding to increase the effective light output. A cover 30 may be provided if desired, to fit over the unit to provide mechanical protection, additional radiation shielding and a light-tight carrying case for the unit. A loop 34 may be attached to the unit and a cord 36 may be attached to the loop so that the portable magnifier may be conveniently carried around the neck of the user. The cover may be attached by means of a pivot 32 on one side of the unit.

The focal length F of lens 12 is selected so that it is essentially equal to the diameter d of the radioluminous ring 10. Optimum uniformity of illumination is achieved by combining lens 12 with the radioluminous ring 10 as a light source when the focal length of the lens 12 is equal to the distance between the ring 10, lens 12 and the object 28 to be viewed, when its magnifier is used.

Although the above example is circular in nature, there is an advantage to having a rectangular or oval shape for some applications. For example, in reading a map with this device, it is sometimes desirable to follow a road or some other marking which tends to be much longer in one dimension than in the other. A rectangular or oval field of illumination in viewing makes the following of such markings easier. The lens, frame and illuminating band or ring are made square, oval or rectangular with essentially the same relationship of size of the luminous band and focal length of lens. Obviously there is some compromise because of the configuration, but essentially the same result of uniform illumination of the magnified area is retained.

What Is claimed is:

1. A self-luminous portable magnifier comprising: a lens, a frame having a viewing aperture therethrough and supporting said lens in a position normal to and substantially coaxially with said aperture; and a radioluminous ring comprised of a radioisotope and a phosphor with a vehicle therefor, said ring being substantially coaxial to said frame and said lens, wherein the diameter of said ring is equal to the distance between said ring and the matter to be viewed and equal to the focal length of said lens, thereby providing uniform illumination of the matter magnified by said lens.

2. The self-luminous portable magnifier of claim 1 wherein said radioisotope is a gas.

3. A self-luminous portable magnifier according to claim 1 having a shielding material around said frame.

4. A self-luminous portable magnifier of claim 1 having a movable cover over the top and bottom of said frame.

5. A self-luminous portable magnifier for the magnified viewing having a ring of radioluminescent material within a cylindrical frame containing an axial aperture therethrough and around a lens cemented to said frame wherein said radioluminous ring is cemented to a shoulder in a frame formed by the lamination of two rings of acrylic plastic material having unequal inner diameter, said lens and radioluminous ring being substantially coaxial to said frame and each other, said radioluminescent ring being of a diameter equal to the focal length of said lens, thereby providing uniform illumination of magnified subject matter.

UNITED STATES PATENT OFFICE
CERTIFICATE OF CORRECTION

Patent No. 3,600,064           Dated August 17, 1971

Inventor(s) Richard N. Walz

It is certified that error appears in the above-identified patent and that said Letters Patent are hereby corrected as shown below:

Column 1, line 29, after the word "read" insert the word --is--.

Column 2, line 31, after the word "the" and before the word "distance" insert --diameter of the ring 10, and therefore is also equal to the--.

Signed and sealed this 18th day of January 1972.

(SEAL)
Attest:

EDWARD M. FLETCHER, JR.      ROBERT GOTTSCHALK
Attesting Officer              Acting Commissioner of Patents